United States Patent [19]

Fornasiero et al.

[11] Patent Number: 5,514,473
[45] Date of Patent: May 7, 1996

[54] BARRIER BLEND FOR USE IN FOOD-PACKAGING FILM

[75] Inventors: Tito Fornasiero; Mario Paleari, both of Milan, Italy

[73] Assignee: W.R. Grace & Co.-Conn., Duncan, S.C.

[21] Appl. No.: 133,695

[22] Filed: Oct. 7, 1993

[30] Foreign Application Priority Data

Oct. 23, 1992 [EP] European Pat. Off. .............. 92830547

[51] Int. Cl.[6] ..................................................... B29D 22/00
[52] U.S. Cl. ........................ 428/36.6; 428/500; 428/522; 428/910
[58] Field of Search .................................. 428/516, 520, 428/518, 910, 36.6, 522

[56] References Cited

U.S. PATENT DOCUMENTS 4,194,039  3/1980  Mueller ................................. 428/518
4,798,751  1/1989  Schuetz ................................. 428/34

FOREIGN PATENT DOCUMENTS 0204918  12/1986  European Pat. Off. .
WO 91/08260  6/1991  WIPO .

*Primary Examiner*—Edith Buffalow
*Attorney, Agent, or Firm*—William D. Lee, Jr.; Mark B. Quatt; Rupert B. Hurley, Jr.

[57] ABSTRACT

A copolymer blend having improved extrusion performance comprising from 90 to 50% by weight of vinylidene chloride-vinyl chloride copolymer and from 10 to 50% by weight of a vinylidene chloride-methyl acrylate copolymer wherein the weight percentage of vinyl chloride in the blend is greater than 12% and the weight percentage of methyl acrylate in the blend is less than 2.8%.

19 Claims, No Drawings

5,514,473

BARRIER BLEND FOR USE IN FOOD-PACKAGING FILM

The present invention relates to new blends of vinylidene chloride copolymers suitable for use as a barrier layer in a film for packaging, for example, meat. The invention further relates to a multilayer film comprising such a blend as a barrier layer and a package comprising the film.

When cuts of meat are produced in the food industry, the packaging of such cuts in a film has become a very important procedure in recent years. Many foods, such as meat, including processed meat, poultry, fish and cheeses are now routinely packaged in film in order to prevent spoilage of the food during transportation and storage. Such packaging may be achieved using, for example, a shrink packaging film having good barrier properties which protects the food from moisture loss and contact with oxygen in the air which could otherwise damage the contents of the package by allowing oxidation. Such films contain a barrier layer to provide these barrier properties and one material which has been used to provide suitable barrier properties is a copolymer of vinylidene chloride and vinyl chloride.

U.S. Pat. No. 4,798,751 (Viskase) describes a heat-shrinkable multilayer film which comprises as a barrier layer a blend of vinylidene chloride-methyl acrylate copolymer and vinylidene chloride-vinyl chloride copolymer comprising between about 2.9 and about 13.5 weight percent of methyl acrylate, and between about 2.9 and about 11.6 weight percent vinyl chloride. Irradiated multilayer films comprising a vinylidene chloride-vinyl chloride copolymer layer alone discolour significantly during storage due to degradation of this layer. Discoloration also occurs when the layer is exposed to temperatures above ambient temperature for sustained periods.

EP 204918 (Union Carbide) has described the use of vinylidene chloride—methyl acrylate copolymers as a barrier layer in shrinkable multilayer films. This copolymer does not significantly discolour when it is irradiated or subjected to prolonged exposure to high temperatures.

U.S. Pat. No. 4,798,751 reports, however, that although the vinylidene chloride-methyl acrylate copolymers possess the advantage of avoiding discoloration, there are, nevertheless, difficulties in processing them as compared with the processing of vinylidene chloride-vinyl chloride copolymer films. The basic problem described in the U.S. patent is that the methyl acrylate copolymer is very temperature and shear sensitive during extrusion into a film. The extrusion can only be performed over a narrow temperature range without causing premature degradation of the polymer in the extruder or die. Such degradation causes particles or gels of degraded material to exit from the extruder causing imperfections in the film. Such imperfections may result in bubble break and waste of the film during extrusion and processing.

Because the optimum melt temperature of the various layers in a multilayer film may be significantly different, the U.S. patent describes a need for a wider range of methyl acrylate copolymer extrusion process temperatures. It is stated that a certain amount of degraded material will form in the extruder and die even at optimum extrusion temperatures and it is important to retain this material in the extrusion system in the form of a thin layer on the extruder and die walls for as long as possible between equipment clean outs.

The object of the invention described in U.S. Pat. No. 4,798,751 is to provide a blend which permits a barrier layer-containing multilayer shrinkable film to be produced which does not discolour on irradiation or sustained exposure to elevated temperatures, but which avoids processing difficulties due to temperature and shear sensitivity during extrusion.

The U.S. specification has, as one of its objects, the avoidance of processing difficulties due to temperature and shear sensitivity during extrusion. The specification is silent as to other features of the extrusion process and in particular the temperatures required to secure high throughput in the extrusion process.

WO 91/08260 refers to the advantageous properties of the blend described in U.S. Pat. No. 4,798,751 but notes that it has certain limitations. The two resins in the blend are said to have a tendency to separate out: blending is described as done most effectively immediately prior to extrusion which requires, for example, additional labour. The aim of the invention of WO 91/08260 is to overcome the perceived difficulties of using a blend by returning to the use of a single resin, a vinylidene chloride-methyl acrylate copolymer, but comprising at least about 0.5 parts per hundred by weight of an acrylic polymer as lubricant. The acrylic polymers used preferably comprise at least one ester of acrylic acid or methacrylic acid and provides lower metal adhesion and thermal degradation during extrusion.

It has now been discovered that certain blends of vinylidene chloride-vinyl chloride copolymers and vinylidene chloride-methyl acrylate copolymers possess significantly improved extrusion properties which are neither disclosed in, nor suggested by, the disclosure of U.S. Pat. No. 4,798,751 or WO 91/08260.

It has been found that certain blends of vinylidene chloride-vinyl chloride and vinylidene chloride-methyl acrylate can be extruded and processed at lower temperatures than those which are needed for either pure vinylidene chloride-vinyl chloride or vinylidene chloride-methyl acrylate copolymers. This decrease in the temperature required to produce a film containing such a barrier layer is contrary to what would be expected; for a mixture of vinylidene chloride-vinyl chloride and vinylidene chloride-methyl acrylate it would be expected that processing temperatures intermediate between those needed for the two pure copolymers would be required.

The invention provides a method of obtaining an increased extrusion rate of a mixture of vinylidene chloride copolymers compared to the extrusion rates obtained when extruding the copolymers separately.

The decreased processing temperature has several advantages. Firstly, it leads to economic advantages, in terms of decreased energy consumption required to produce packaging films containing such a barrier layer and therefore to reduced cost. In addition, the use of lower processing temperatures reduces the risk of thermal decomposition of the packaging film. Where certain blends of vinylidene chloride-vinyl chloride and vinylidene chloride-methyl acrylate are used the throughput of material in producing the packaging film is substantially increased compared to the throughput which is obtained in producing a film comprising a comparable barrier layer of vinylidene chloride-vinyl chloride or vinylidene chloride-methyl acrylate under the same operating conditions.

Rheological test data have been obtained in investigations of the behaviour of the new blends as compared with vinylidene chloride-vinyl chloride and vinylidene chloride-methyl acrylate copolymers: the data obtained gives no suggestion that the increased throughput formed in practice might be achieved. Surprisingly the data obtained do not correlate with the improved extrusion performance.

The present invention therefore provides a copolymer blend comprising from 90 to 50% by weight of a vinylidene chloride-vinyl chloride copolymer and from 10 to 50% by weight of a vinylidene chloride-methyl acrylate copolymer and, preferably, from 1 to 5% by weight, relative to the total weight of the copolymer blend, of a plasticizer and/or stabiliser wherein the weight percentage of vinyl chloride in the blend is greater than 12% and the weight percentage of methyl acrylate in the blend is less than 2.8%.

According to a preferred embodiment of the invention, the blend comprises from 75 to 65% by weight of vinylidene chloride-vinyl chloride copolymer and from 25 to 35% by weight of vinylidene chloride-methyl acrylate copolymer. More preferably, the blend comprises about 70% vinylidene chloride-vinyl chloride copolymer and about 30% by weight vinylidene chloride-methyl acrylate copolymer.

The vinylidene chloride-vinyl chloride copolymer used in the present invention preferably comprises from 15 to 30%, preferably 20 to 24%, more preferably about 22%, vinyl chloride and from 85 to 70%, preferably 80 to 76%, more preferably about 78%, vinylidene chloride. The vinylidene chloride-vinyl chloride copolymer preferably has a molecular weight from 70,000 to 160,000, more preferably from 90,000 to 140,000. The copolymer generally has a melting point from 136° to 142° C., more preferably 138° to 140° C., and a relative viscosity from 1.40 to 1.70, more preferably 1.50 to 1.60. The vinylidene chloride-vinyl chloride may be produced by either emulsion or suspension polymerisation, though it is preferred that emulsion polymerised material be used.

Relative viscosities referred to in this specification are measured according to ASTM method D2857 using a solution of the resin in tetrahydrofuran.

The vinylidene chloride-methyl acrylate copolymer preferably comprises from 6.5 to 9.5%, preferably 7.5 to 8.5%, more preferably about 8% by weight of methyl acrylate and from 93.5 to 90.5%, preferably 91.5–92.5%, more preferably about 92% by weight of vinylidene chloride. The vinylidene chloride-methyl acrylate copolymer is preferably a suspension polymerised copolymer and preferably has a molecular weight from 80,000 to 140,000, preferably 100,000–120,000. Preferably, the vinylidene chloride-methyl acrylate copolymer has a melting point of about 155° C. and a relative viscosity of about 1.48.

The blend of the present invention preferably comprises from 1 to 5%, preferably from 2 to 3% by weight of a plasticizer and/or stabiliser (about 2% by weight is preferred), which is generally a liquid plasticizer. Conventional materials may be used. Examples of suitable materials include epoxidised soyabean oil, epoxidised linseed oil, dibutyl sebacate and glycerol monostearate. The use of epoxidised soyabean oil is preferred.

The invention also provides a multilayer film comprising a barrier layer which layer comprises the copolymer blend according to the invention. Such films are preferably heat-shrinkable. They preferably comprise a heat-sealable layer, a barrier layer comprising the blend of the present invention, and an abuse-resistant layer: additional layers may be present.

The invention further provides a process for producing such a multilayer film according to the invention which comprises extruding, for example, the heat-sealable, barrier and abuse-resistant layers and preferably orienting the extruded layers.

The multilayer film of the present invention, comprises, in addition to the barrier layer, a heat-sealable layer and an abuse-resistant layer: additional layers may also be present. The film may further comprise an intermediate or core layer between the heat-sealable and barrier layers so as to provide a four-layer structure. In the four-layer structure, the heat-sealable layer generally has a thickness of from 5 to 30 μm, preferably about 10 μm, the core or intermediate layer has a thickness from 15 to 40 μm, preferably about 25 μm, the barrier layer has a thickness from 3 to 10 μm, preferably from 5 to 6 μm, and the abuse-resistant layer has a thickness from 5 to 30 μm, preferably about 16 μm.

In an alternative embodiment the film of the present invention has a six-layer structure. This comprises a heat-sealable layer, first and second intermediate or core layers between the heat-sealable and barrier layers, a third core layer between the barrier and abuse-resistant layer, and the abuse-resistant layer. In this embodiment, the heat-sealable layer generally has a thickness from 5 to 30 μm, preferably about 10 μm, the first intermediate layer has a thickness from 5 to 20 μm, preferably about 12 μm, the second intermediate layer has a thickness from 5 to 30 μm, preferably about 15 μm, the barrier layer has a thickness from 3 to 10 μm, preferably about 5 to 6 μm, the third intermediate layer has a thickness from 5 to 20 μm, preferably about 11 μm, and the abuse-resistant layer has a thickness from 3 to 10 μm, preferably about 4 μm.

In general, the film of the present invention will have a total thickness from 40 to 120 μm, preferably 50 to 90 μm and more preferably about 60 μm.

In this specification and the accompanying claims:

The term "linear low density polyethylene" (LLDPE) refers to copolymers of ethylene with one or more comonomers selected from $C_4$–$C_{10}$ alpha olefins such as but-1-ene, oct-1-ene and hex-1-ene: the polymer molecules comprise long chains with few branches. The specific gravity is generally from 0.916 to 0.925 and will generally depend on the comonomer content.

The term "very low density polyethylene" (VLDPE) refers to linear polyethylene polymers similar to LLDPE but having generally lower specific gravities, for example of 0.915 to 0.860 or lower.

The term "ethylene-vinyl acetate copolymer" (EVA) refers to a copolymer formed from ethylene and vinyl acetate monomers wherein the ethylene units are present in a major amount and the vinyl acetate units are present in a minor amount.

The term "ionomer" refers to, for example, a copolymer of ethylene with a copolymerisable ethylenically unsaturated acidic monomer, usually an ethylenically unsaturated carboxylic acid, which may be di- or mono basic but is generally mono-basic, for example acrylic or methacrylic acid, in its ionised rather than its free acid form, the neutralising cation being any suitable metal ion for example an alkali metal ion, zinc ion or other multivalent metal ion. Surlyn is a Trademark of a suitable ionomer marketed by Du Pont.

Adhesive or tie layers in the films of the present invention to aid adhesion of adjacent layers can be any of those known to be useful in adhering adjacent layers of coextruded films. Suitable adhesive layers comprise, for example, chemically modified ethylene polymers for example, copolymers of ethylene with esters of ethylenically unsaturated carboxylic acids, such as alkyl acrylates or methacrylates, graft copolymers of maleic acid or anhydride onto ethylene vinyl acetate copolymers, graft copolymers of fused ring carboxylic anhydrides onto polyethylene, resin mixtures of these and mixtures with polyethylene or copolymers of ethylene and alpha olefin. Such materials include adhesives sold under the tradename Bynel (Du Pont) or Admer (Mitsui).

The heat-sealable layer used in the film of the present invention may be any conventional heat-sealable layer. Such a layer may for example be a VLDPE, LLDPE, ethylene vinyl acetate copolymer, or ionomer (for example Surlyn), EAA, EMAA, ethylene propylene copolymer, or ethylene butyl acrylate copolymer layer. In a preferred embodiment, a VLDPE heat-sealable layer is used.

The abuse-resistant layer in the film of the invention may be any conventional type of such layer, for example an ethylene vinyl acetate copolymer, VLDPE, copolyamide, LLDPE, ionomer (e.g. Surlyn) or EMAA layer. In a particular embodiment, the abuse-resistant layer is an ethylene vinyl acetate copolymer layer, preferably having a vinyl acetate content of about 9%.

It will be understood that blends of resins may be used in place of individual resins in the various layers of the laminates of the invention, particularly in the heat-sealable and abuse-resistant layers.

Where a core or intermediate layer or layers is present between the heat-sealable and barrier layers, this may for example be an ethylene vinyl acetate copolymer, ethylene butyl acrylate copolymer, or EMAA layer. In a particular embodiment, a core layer of ethylene vinyl acetate copolymer, preferably having a vinyl acetate content of about 9%, is used in the four-layer structure.

In the six-layer structure described above, the two intermediate or core layers between the heat-sealable and barrier layer may in a specific embodiment, both be ethylene vinyl acetate layers. In this embodiment, preferably the first intermediate or core layer, which is adjacent to the heat-sealable layer, comprises 18% vinyl acetate, and the second intermediate or core layer, which is adjacent to the barrier layer, comprises about 9% vinyl acetate. The abuse layer of ethylene vinyl acetate preferably comprises about 9% of vinyl acetate.

Where an intermediate layer is present between the barrier layer and the abuse-resistant layer, such as in the six-layer structure described above, the intermediate layer may comprise, for example, VLDPE. It will be appreciated that in some cases where an intermediate or core layer of VLDPE is present this may not bond satisfactorily to some abuse-resistant layers, such as an ionomer layer, without the use of an adhesive or tie layer. In such cases, it will be appreciated that it may be necessary either to use a separate tie layer, for example comprising an acid modified ethylene vinyl acetate copolymer, or to use in the core or intermediate layer a blend of VLDPE and such a modified ethylene vinyl acetate copolymer. The EVA copolymer may be modified with, for example, maleic anhydride.

The film of the present invention may be produced using conventional techniques for the extrusion and lamination of the film.

The invention provides a method of making a film which comprises preparing a blend according to the invention, extruding the blend to form a film and, optionally, orienting and/or cross-linking the film. Multilayer films may be cross-linked by irradiation of the whole film. In a preferred embodiment one or more layers of a multilayer film (the substrate) are extruded and subsequently cross-linked by irradiation; and the barrier layer and any further layers are then extruded onto the substrate.

In a specific embodiment, using a tubular extruder the heat-sealable layer and, any intermediate layers present between the heat-sealable layer and the barrier layer are coextruded and these layers are then irradiated by electron bombardment to provide cross-linking and increase the strength of the extruded layers. Generally, the irradiation is performed using high energy electrons to provide a dosage of from 1 to 10 MRad, preferably 3 to 7, for example about 4.5 MRad. Cross-linking may also be effected in known manner using chemical cross-linking agents.

After irradiation, the barrier layer and remaining layers of the film, including the abuse-layer, are extruded onto the irradiated layers (or substrate). The film is then preferably oriented biaxially, (for example, by a factor from 3 to 5) in both the machine and transverse directions. Orientation may, for example, be effected by the known trapped bubble technique which is well-known in the art. The extruded tubular film is cooled and collapsed. The tubular film is subsequently fed through a bath of hot water and, as it leaves the hot water it is inflated and blown into thin tubing. The tubular film is rapidly cooled and then rolled-up for further processing. Preferably the orientation is carried out at a temperature from 85° to 100° C., more preferably 90° to 95° C. Heat shrinkable films according to the invention are preferred.

The film of the invention may be used to form a package in conventional manner. For example, when the film is produced as a tubular film, bags can be formed by transverse sealing and cutting across the flattened tubular film to make individual bags. Alternatively, bags may be made by slitting the tubular film along one edge and then transversely sealing and severing the film to produce bags. Other methods of making bags and packages are known and may be readily adapted to use with the multilayer films of the invention.

A package or bag formed from a film according to the present invention may for example be used to package uncooked meat, poultry, fish, processed meat and in some cases cheese. Barrier films according to the present invention preferably have an oxygen permeability less than about 70 $cm^3/m^2/24$ hr/atm measured according to ASTM D3985, preferably less than 40 $cm^3/m_2/24$ hr/atm, carrying out the test at 0% relative humidity at 23° C.

The present invention will now be described in more detail with particular reference to the following Examples:

In the following Examples thermal stability was determined using a Brabender mixer. A test temperature of 160° C. was used. The first rotor speed was 63 rpm, the second rotor speed being 73 rpm. The amount of material inside the mixing chamber was 60 g. The mixing chamber is conditioned prior to use for 60 min at 160° C. After addition of the test sample to the mixing chamber a first specimen is sampled after 4 minutes and further specimens are sampled at two minute intervals until decomposition of the test sample. Thermal decomposition is judged by reference to the onset of black discolouration in the test sample.

EXAMPLE 1

Using a 2½" PVDC extruder (equipped with a screw of length: diameter ratio 18:1, compression ratio 3.5:1, constant taper profile) operating at 50 rpm a blend of 68% vinylidene chloride-vinyl chloride copolymer (22% vinyl chloride content, average molecular weight 110,000), 30% vinylidene chloride-methyl acrylate copolymer (8.5% methyl acrylate content, average molecular weight 110,000) and 2% epoxidised soyabean oil as plasticizer was extruded.

During extrusion, the extruder was run using the following temperature profile:

Zone 1: 60° C.

Zone 2: 80° C.

Zone 3: 115° C.

Adaptor: 110° C.

The die was maintained at 155° C. in a first trial and 160° C. in a second.

A throughput of 79 to 84 kg/h of PVDC blend was obtained at both die temperatures.

The blend showed a thermal stability, measured by the procedure described above, of from 7 to 8 minutes.

Comparative Example

Using the same procedure and apparatus as in Example 1 a blend of the vinylidene chloride-vinyl chloride copolymer used in Example 1 with 2% epoxidised soyabean oil (A) and the vinylidene chloride-methyl acrylate copolymer used in Example 1 with 2% epoxidised soyabean oil (B) were extruded.

The temperatures used in the extruder were as follows:

(A) Zone 1: 60° C.

Zone 2: 95° C.

Zone 3: 126° C.

Adaptor: 122° C.

(B) Zone 1: 90° C.

Zone 2: 110° C.

Zone 3: 130° C.

Zone 4: 125° C.

In both cases the die was maintained at 160° C.

The throughput obtained in producing the films (A) and (B) using the extruder at 50 rpm was found to be substantially lower than that obtained in Example 1. In a 12 hour trial the throughput of (A) was about 60 kg/h. In a 48 hour trial the throughput of (A) was 65 kg/h. In a trial on (B) the throughput was 68 kg/h.

It will be appreciated that the temperatures required to extrude the materials (A) and (B) in the extruder and adaptor (between the extruder and die) are higher than those required in Example 1, especially in the region of zone 3 of the extruder and the adaptor.

The blends showed thermal stabilities, measured by the procedure described above, of 8 minutes (blend A) and 6 to 7 minutes (blend B).

The reasons for the higher output using the blends according to the invention are not clearly understood. Rheological data obtained in testing of blends A and B and of the blend used in Example 1 are given in the following table. The data do not correlate with the extrusion test results in the Example and Comparative Examples and provide no indication that the advantageous results might be obtained in terms of throughput and/or lower extrusion temperatures using the blends of the invention.

RHEOLOGICAL RESULTS

A series of rheological tests were carried out using a Brabender laboratory extruder with attached instrumentation. The extruder barrel has a diameter of 19 mm and is equipped with a 3-zone screw of length: diameter ratio 25:1 and compression ratio 4:1. The ratio of zone lengths is:

| Feeding Zone | 10 D (10 Diameters) |
| --- | --- |
| Compression Zone | 3 D |
| Metering Zone | 12 D |

This extruder was used to process the three blends described previously, using two different temperature profiles, described for simplicity according to the die temperature (150° C. and 160° C. respectively).

Results are shown in the following tables:

| BLEND TYPE | SPEED (rpm) | OUTPUT (kg/h) | TORQUE (Nm) | VISCOSITY (Pas) | SHEAR RATE (1/s) |
| --- | --- | --- | --- | --- | --- |
| 150° C. | | | | | |
| BLEND A | 20 | 0.672 | 50–56 | 13482 | 9.33 |
| | 50 | 1.692 | 62–71 | 9068 | 23.50 |
| | 80 | 2.706 | 73–76 | 5189 | 37.58 |
| | 110 | 3.720 | 71–73 | 3906 | 51.66 |
| BLEND B | 20 | 0.780 | 80–93 | 10146 | 10.15 |
| | 50 | 1.764 | 67–73 | 5103 | 22.96 |
| | 80 | 2.658 | 67–72 | 4601 | 34.60 |
| | 110 | 3.624 | 67–70 | 3499 | 47.18 |
| INVENTION | 20 | 0.732 | 68–80 | 14760 | 8.86 |
| | 50 | 1.764 | 75–80 | 7504 | 21.36 |
| | 80 | 2.718 | 74–76 | 5604 | 32.92 |
| | 110 | 3.726 | 73–76 | 4511 | 45.13 |
| 160° C. | | | | | |
| BLEND A | 20 | 0.738 | 46–56 | 7888 | 9.66 |
| | 50 | 1.758 | 58–72 | 5249 | 23.03 |
| | 80 | 2.790 | 67–75 | 4439 | 36.55 |
| | 110 | 3.780 | 70–75 | 3332 | 49.52 |
| BLEND B | 20 | 0.774 | 68–80 | 6117 | 9.54 |
| | 50 | 1.806 | 66–70 | 4134 | 22.26 |
| | 80 | 2.784 | 66–68 | 3227 | 34.31 |
| | 110 | 3.726 | 66–70 | 3029 | 45.93 |
| INVENTION | 20 | 0.780 | 67–80 | 7157 | 10.28 |
| | 50 | 1.860 | 63–80 | 4539 | 24.52 |
| | 80 | 2.838 | 72–75 | 4160 | 37.42 |
| | 110 | 3.852 | 72–75 | 3142 | 50.79 |

We claim:

1. A copolymer blend comprising from 90 to 50% by weight of vinylidene chloride-vinyl chloride copolymer and from 10 to 50% by weight of a vinylidene chloride-methyl acrylate copolymer wherein the weight percentage of vinyl chloride in the blend is greater than 12% and the weight percentage of methyl acrylate in the blend is less than 2.8%.

2. A blend according to claim 1 which comprises from 75 to 65% by weight of vinylidene chloride-vinyl chloride copolymer and from 25 to 35% weight of vinylidene chloride-methyl acrylate copolymer.

3. A blend according to claim 1 or 2 which comprises about 70% of vinylidene chloride-vinyl chloride copolymer and about 30% by weight of vinylidene chloride-methyl acrylate copolymer.

4. A blend according to claim 1, wherein the vinylidene chloride-vinyl chloride copolymer comprises from 20 to 24% by weight of vinyl chloride and from 80 to 75% by weight of vinylidene chloride.

5. A blend according to claim 1, wherein the vinylidene chloride-vinyl chloride copolymer has a molecular weight of 90,000 to 140,000.

6. A blend according to claim 1, wherein the vinylidene chloride-methyl acrylate polymer comprises from 7.5 to 8.5% by weight of methyl acrylate and from 91.5 to 92.5% by weight of vinylidene chloride.

7. A blend according to claim 1, wherein the vinylidene chloride-methyl acrylate polymer copolymer has a molecular weight of 100,000 to 120,000.

8. A blend according to claim 1, which comprises from 1 to 5% by weight of a plasticizer or stabilizer.

9. A blend according to claim 8 which comprises about 2% by weight of plasticizer and/or stabiliser.

10. A blend according to claim 1, which comprises, as plasticizer or stabilizer, epoxidized soybean oil.

11. A film comprising a copolymer blend comprising from 90 to 50% by weight of vinylidene chloride-vinyl chloride copolymer and from 10 to 50% by weight of a vinylidene chloride-methyl acrylate copolymer wherein the weight percentage of vinyl chloride in the blend is greater than 12% and the weight percentage of methyl acrylate in the blend is less than 2.8%.

12. A film according to claim 11 which comprises a heat-sealable layer, a barrier layer comprising a blend according to any one of the preceding claims, and an abuse-resistant layer.

13. A film according to claim 11 or 12 which is heat-shrinkable.

14. A package or bag comprising a film comprising a copolymer blend comprising from 90 to 50% by weight of vinylidene chloride-vinyl chloride copolymer and from 10 to 50% by weight of a vinylidene chloride-methyl acrylate copolymer 12% and the weight percentage of methyl acrylate in the blend is less than 2.8%.

15. A method of making a film comprising:

preparing a blend comprising from 90 to 50% by weight of vinylidene chloride-vinyl chloride copolymer and from 10 to 50% by weight of a vinylidene chloride-methyl acrylate copolymer wherein the weight percentage of vinyl chloride in the blend is greater than 12% and the weight percentage of methyl acrylate in the blend is less than 2.8%; and extruding the blend to form a film.

16. A method according to claim 15 in which one or more layers of a multilayer film are extruded to form a substrate, the substrate is irradiated, and a barrier layer comprising a blend as defined in claim 1 and any other layers of the film are extruded onto the irradiated substrate.

17. The method according to claim 15, wherein the film is cross-linked.

18. The method according to claim 15, wherein the film is oriented.

19. The method according to claim 18, wherein the film is cross-linked.

* * * * *